US008924927B2

(12) United States Patent
Clifford et al.

(10) Patent No.: US 8,924,927 B2
(45) Date of Patent: Dec. 30, 2014

(54) REPRESENTATION AND CONVERSION OF DYNAMICALLY-TYPED ARRAYS

(75) Inventors: Daniel Kenneth Clifford, Baldham (DE); Jakob Martin Rüdiger Kummerow, Garching (DE); Yang Guo, Munich (DE)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/487,090

(22) Filed: Jun. 1, 2012

(65) Prior Publication Data

US 2013/0325904 A1     Dec. 5, 2013

(51) Int. Cl.
*G06F 9/44*        (2006.01)
(52) U.S. Cl.
USPC .......................................................... 717/114
(58) Field of Classification Search
USPC .......................................................... 717/114
See application file for complete search history.

(56) References Cited

U.S. PATENT DOCUMENTS

| | | | |
|---|---|---|---|
| 6,067,413 | A | 5/2000 | Gustafsson et al. |
| 2003/0188295 | A1 | 10/2003 | Adl-Tabatabai et al. |
| 2006/0212847 | A1 | 9/2006 | Tarditi et al. |
| 2007/0234288 | A1 | 10/2007 | Lindsey et al. |
| 2008/0005731 | A1* | 1/2008 | Markovic et al. ............. 717/162 |
| 2009/0281894 | A1* | 11/2009 | Ratnaparkhi ............... 705/14.43 |
| 2012/0079246 | A1* | 3/2012 | Breternitz et al. ............ 712/208 |

OTHER PUBLICATIONS

Hunlock, "Mastering Javascript Arrays", Mar. 25, 2007; Web page. Source:: http://www.hunlock.com/blogs/Mastering_Javascript_Arrays.*
Aumanets et al., "Cast primitive type array into object array in java", Apr. 9, 2011; Web page. Source:: http://stackoverflow.com/questions/5606338/cast-primitive-type-array-into-object-array-in-java.*
Mohan, "To convert all elements in an array to integer in javascript?", Dec. 14, 2010; Web page. Source:: http://stackoverflow.com/questions/4437916/to-convert-all-elements-in-an-array-to-integer-in-javascript.*

* cited by examiner

*Primary Examiner* — Li B Zhen
*Assistant Examiner* — Sen Chen
(74) *Attorney, Agent, or Firm* — McDermott Will & Emery LLP

(57) ABSTRACT

Representation of an array in dynamically-typed program code at runtime is provided. Program code is accessed at runtime. An instruction for adding, updating or deleting one or more elements for an array is detected within the code. The array is associated with a first kind of element comprising a first representation and packing format. A second kind of element is determined based on at least one of the instruction or the one or more elements, the second kind of element comprising at least one of a second representation or packing format. A determination is made that the first and second kind of elements are not consistent, based on an inconsistency between the first and second representation formats or packing formats. The array is converted so that the first and second kind of elements are consistent. One or more array elements are added, updated or deleted based on the instruction.

20 Claims, 4 Drawing Sheets

REPRESENTATION AND CONVERSION OF DYNAMICALLY-TYPED ARRAYS

FIELD

The subject technology generally relates to dynamically-typed program code and, in particular, relates to representing an array in dynamically-typed program code at runtime.

BACKGROUND

Many statically typed languages like C and C++ store double-precision floating-point values (or "double values") in memory in a compact and efficient "raw" format, for example, with each double value occupying 64 bits of memory (e.g., using the IEEE 754 64-bit format). Because the types of values and therefore their representation are known when a program is compiled in these languages, the compiler can generate efficient code that loads, stores and manipulates double values in memory. In a dynamically-typed language (e.g., JavaScript), the type of a value is often not known until runtime. This makes it difficult for a language implementation to use the simple and efficient "raw" storage format for double values.

SUMMARY

The disclosed subject matter relates to a machine-implemented method of representing an array in dynamically-typed program code at runtime. The method comprises accessing program code at runtime, the program code corresponding to a dynamically-typed programming language, and detecting, within the program code, an instruction for adding, updating or deleting one or more elements for an array. The array is associated with a first kind of element, the first kind of element comprising a first representation format and a first packing format. The method further comprises determining a second kind of element based on at least one of the instruction or the one or more elements, the second kind of element comprising at least one of a second representation format or a second packing format, and determining that the first kind of element is not consistent with the second kind of element, based on an inconsistency between the first and second representation formats or the first and second packing formats. In addition, the method comprises converting the array so that the first kind of element is consistent with the second kind of element, and adding, updating or deleting one or more elements for the converted array based on the instruction.

The disclosed subject matter further relates to a system for representing an array in dynamically-typed program code at runtime. The system comprises one or more processors, and a machine-readable medium comprising instructions stored therein, which when executed by the processors, cause the processors to perform operations comprising accessing program code at runtime, the program code corresponding to a dynamically-typed programming language, and detecting, within the program code, an instruction for adding or updating one or more elements for an array. The array is associated with a first kind of element, the first kind of element comprising a first representation format. The operations further comprise determining a second kind of element based on at least one of the instruction or the one or more elements, the second kind of element comprising a second representation format which is based on a data type of the one or more elements, and determining that the first kind of element is not consistent with the second kind of element, based on an inconsistency between the first and second representation formats. In addition, the operations comprise converting the array so that the first kind of element is consistent with the second kind of element, and adding or updating the one or more elements for the converted array based on the instruction.

The disclosed subject matter also relates to a machine-readable medium comprising instructions stored therein, which when executed by a system, cause the system to perform operations comprising accessing program code at runtime, the program code corresponding to a dynamically-typed programming language, and detecting, within the program code, an instruction for deleting one or more elements for an array or for adding one or more elements beyond the end of the array. The array is associated with a first kind of element, the first kind of element comprising a first packing format. The operations further comprise determining a second kind of element based on at least one of the instruction or the one or more elements, the second kind of element comprising a second packing format, and determining that the first kind of element is not consistent with the second kind of element, based on an inconsistency between the first and second packing formats. In addition, the operations comprise converting the array so that the first kind of element is consistent with the second kind of element. The operations further comprise deleting the one or more elements for the converted array or adding the one or more elements beyond the end of the converted array based on the instruction.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
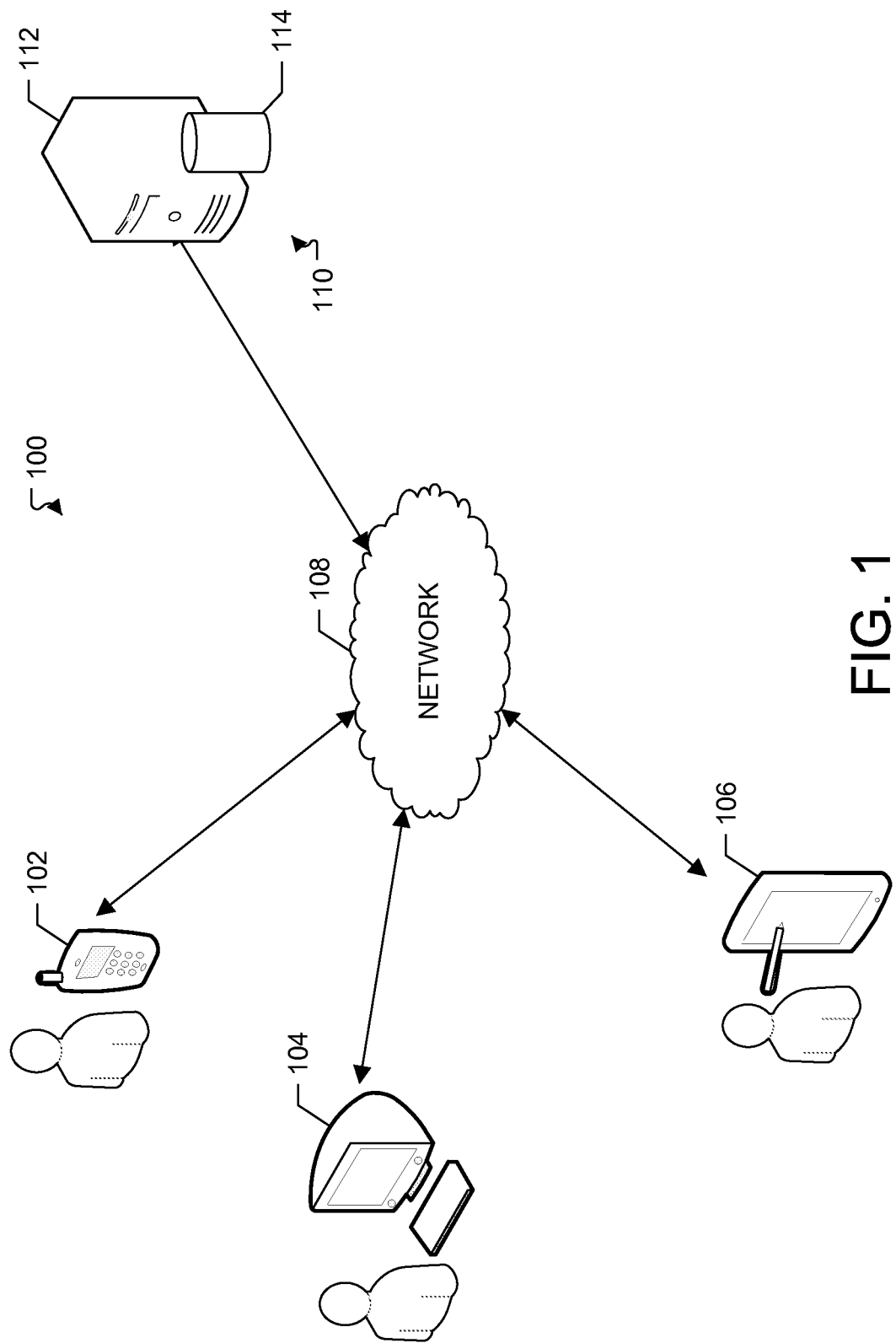
FIG. 1 illustrates an example distributed network environment which can provide for processing program code.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Many statically typed languages like C and C++ store double values in memory in a compact and efficient "raw" format (e.g., with each double value occupying 64 bits of memory). Because the types of values and therefore their representation are known when a program is compiled in these languages, the compiler can generate efficient code that loads, stores and manipulates double values in memory. In a dynamically-typed language, the type of a value is often not known until runtime. This makes it difficult for a language implementation to use the simple and efficient "raw" storage format for double values. Dynamically-typed languages include, but are not limited to, APL, Erlang, Groovy, JavaScript, Lisp, Lua, MATLAB, GNU Octave, Perl (for user-defined types, but not built-in types), PHP, Pick BASIC, Prolog, Python, Ruby, Smalltalk and Tcl.

The subject disclosure provides for tracking an array's representation format (e.g. small integer, double value or tagged), and whether or not the array is packed. A tagged value type can correspond to object pointers, small integers or heap numbers. As used herein, a "packed" array refers to an array with no deleted elements, and a "nonpacked" array refers to an array having deleted or otherwise empty elements. The additional information for tracking the type of the array is stored as part of the array's internal type, for example, as a "hidden-class" value of the array.

More particularly, the subject disclosure provides for representing an array in dynamically-typed program code at runtime. Program code is accessed at runtime, the program code corresponding to a dynamically-typed programming language. An instruction for adding, updating or deleting one or more elements for an array is detected within the program code, where the array is associated with a first kind of element, the first kind of element comprising a first representation format and a first packing format. A second kind of element is determined based on at least one of the instruction or the one or more elements, the second kind of element comprising at least one of a second representation format or a second packing format. A determination is made that the first kind of element is not consistent with the second kind of element, based on an inconsistency between the first and second representation formats or the first and second packing formats. The array is converted so that the first kind of element is consistent with the second kind of element. One or more elements are added, updated or deleted for the converted array based on the instruction.

FIG. 1 illustrates an example distributed network environment which can provide for processing program code. A network environment 100 includes a number of electronic devices 102-106 communicably connected to a server 110 by a network 108. Server 110 includes a processing device 112 and a data store 114. Processing device 112 executes computer instructions stored in data store 114, for example, to host an application (e.g., a website). Users may interact with the application, via network 108, using any one of electronic devices 102-106.

In example aspects, program code can be accessed at runtime, where the program code corresponds to a dynamically-typed programming language. For example, the program code can be accessed by any of electronic devices 102-106. An instruction for adding, updating or deleting one or more elements for an array is detected within the program code (e.g., at the electronic device), where the array is associated with a first kind of element, the first kind of element comprising a first representation format and a first packing format. A second kind of element is determined based on at least one of the instruction or the one or more elements, the second kind of element comprising at least one of a second representation format or a second packing format. A determination is made that the first kind of element is not consistent with the second kind of element, based on an inconsistency between the first and second representation formats or the first and second packing formats. The array is converted so that the first kind of element is consistent with the second kind of element (e.g., at the electronic device). One or more elements are added, updated or deleted for the converted array based on the instruction (e.g., at the electronic device).

Electronic devices 102-106 can be computing devices such as laptop or desktop computers, smartphones, PDAs, portable media players, tablet computers, or other appropriate computing devices that can be used, for example, to access web applications. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing devices working together to perform the actions of a server computer (e.g., cloud computing). Examples of computing devices that may be used to implement server 110 include, but are not limited to, a web server, an application server, a proxy server, a network server, or a group of computing devices in a server farm.

Communication between any of electronic devices 102-106 and server 110 may be facilitated through a network (e.g., network 108). Network 108 can be a public communication network (e.g., the Internet, cellular data network, dialup modems over a telephone network) or a private communications network (e.g., private LAN, leased lines). Communications between any of electronic devices 102-106 and server 110 may be facilitated through a communication protocol such as Hypertext Transfer Protocol (HTTP). Other communication protocols may also be facilitated for some or all communication between any of electronic devices 102-106 and server 110, including for example, Extensible Messaging and Presence Protocol (XMPP) communication.

Figure 2:
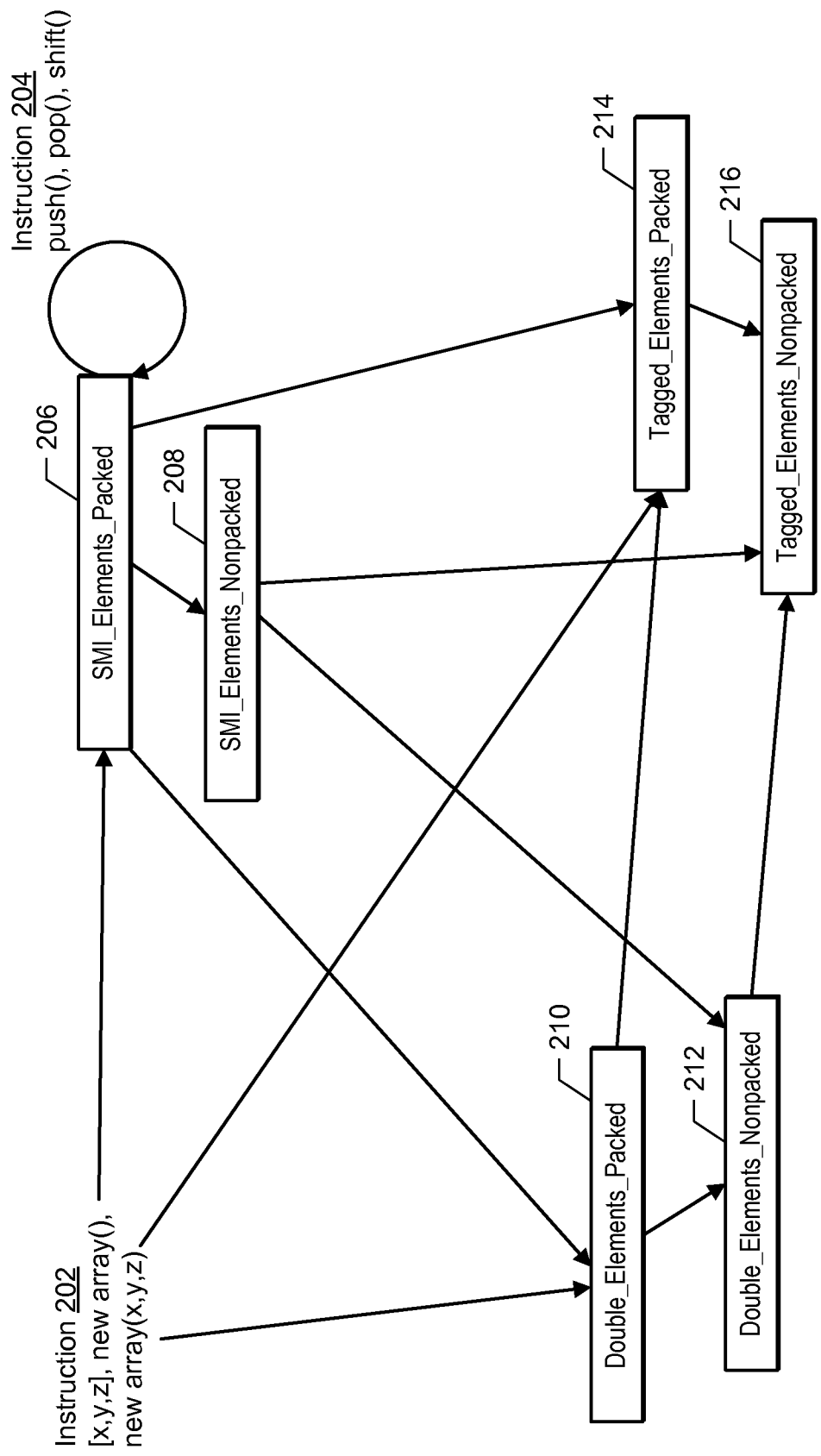
FIG. 2 is a block diagram illustrating an example of effecting element kind transitions upon array updates.

FIG. 2 is a block diagram illustrating an example of effecting element kind transitions upon array updates. As noted above, in a dynamically-typed language, the type of a value is often not known until runtime. This can make it difficult for a language implementation to use the simple and efficient "raw" storage format (e.g., 64-bit) for double values.

One solution is to allocate small objects to hold double values called heap numbers. As used herein, the technique of wrapping primitive values in objects is referred to as "boxing". The advantage of boxing is that it allows a language runtime to internally treat double values like any other object (e.g., JavaScript object). Even if a value's type changes at runtime, the program code engine can generate a single version of compiled functions (e.g., JavaScript functions) that work with values that can have either object or double types.

One disadvantage of this approach is that double values consume more memory in RAM when stored as boxed heap number objects. This higher memory consumption can be considerable with large arrays of boxed double values. In this case, an array of boxed values typically uses twice as much memory than the same array would in an unboxed form.

A second disadvantage is performance. In this regard, arithmetic operations on boxed double value require an extra memory indirection to access the "payload" (e.g., a 64-bit IEEE-754 payload) of a heap number object. When a new double value is created (e.g., as the result of an arithmetic operation), a new heap number must be allocated to hold the result value. This allocation can be much slower than simply storing the 64-bit double value.

In example aspects of the subject technology, auto-unboxing of double arrays can be used to mitigate the above disadvantages for large arrays of double values. By internally tracking the types of values contained in an array of boxed values, it is possible to recognize and exploit situations when auto-unboxing of double arrays would decrease memory consumption and increase performance. In these situations, arrays can be converted to the optimal storage format (e.g., small integer, double value or tagged array) by tracking the values that are stored in the array at runtime.

Without changing language semantics, this conversion reduces the memory consumed by double arrays and allows a compiler (e.g., a just-in-time (JIT) compiler) to generate efficient specialized code that operates directly on an array without boxed values.

The subject disclosure provides for tracking the type of an array's elements representation format (e.g. small integer, double value or tagged), and a packing format of the array (e.g., packed or nonpacked). This additional information is stored in a hidden-class value of the array. As used herein, the additional information for tracking of the type of the array and the format of the array is referred to as an "ElementsKind" for the array. It should be noted that the hidden-class value is not limited to storing the ElementsKind for the array, and can include additional information. In this regard, hidden-class checks can access the ElementsKind value or any other information included with the hidden-class value.

Small integer values (SMIs) can be stored without additional allocation in arrays of object values, since SMIs always differ from pointers to objects in their least-significant bit. Specifically, for SMIs, the lower bit is cleared and for objects pointers (e.g., including heap number pointers), the lower bit is set. Because many arrays initially contain only SMIs (e.g., an array initialized to contain only zeros) and can later become populated with double values, SMI-only arrays are tracked with the ElementsKind value so that they can be optimized when double values are stored into them.

In example aspects, and with reference to FIG. 2, the ElementsKind value is set as one of the following values:
SMI_Elements_Packed 206
SMI_Elements_Nonpacked 208
Double_Elements_Packed 210
Double_Elements_Nonpacked 212
Tagged_Elements_Packed 214
Tagged_Elements_Nonpacked 216

In this regard, arrays with ElementsKind of SMI_Elements_Packed 206 must contain only small integer values (SMIs). Arrays with ElementsKind of SMI_Elements_Nonpacked 208 must contain only SMIs and "hole" sentinel values indicating a deleted or uninitialized array value. For example, at least one reason it is worth tracking arrays with holes is that the code generated by the optimizing compiler for arrays with holes typically performs more work than the code for arrays without holes.

Arrays with ElementsKind of Double_Elements_Packed 210 contain only double values. Arrays with ElementsKind of Double_Elements_Nonpacked 212 contain only double values and "hole" sentinel values.

Arrays with ElementsKind of Tagged_Elements_Packed 214 may contain any object pointer, including SMIs, heap numbers and objects. Arrays with Tagged_Elements_Nonpacked 216 may contain elements of any type, excluding raw double values and including "hole" sentinel values.

In the example of FIG. 2, an instruction 202 for creating or allocating an array can be associated with any value for ElementsKind. In this regard, the initial ElementsKind of an array is determined when allocated by an array constructor (e.g., "Array()" in JavaScript) or by an array literal, when it is possible to determine the optimal array format from the specified arguments to the array constructor. Otherwise, it is set to Tagged_Elements_Nonpacked 216. Empty arrays initially have a hidden-class value containing an ElementsKind of SMI_Elements_Packed 206. An example of programming code (e.g., JavaScript) is as follows:

```
var a = new Array( );                // has SMI_Elements_Packed 206
var b = new Array(5);                // has SMI_Elements_Nonpacked 208
var c = [2.5, 0.5, 10.2, 3.5];       // has Double_Elements_Packed 210
var d = [2.5,,,3.5];                 // has Double_Elements_Nonpacked 212
var e = new Array(65,                // has Tagged_Elements_Packed 214
new Object( ), 3.5);
var f = [2.5,,, new Object( )];      // has Tagged_Elements_Nonpacked 216
```

As can be seen in FIG. 2, a transition graph for ElementsKind form a lattice:

SMI_Elements_Packed 206→SMI_Elements_Nonpacked 208

SMI_Elements_Packed 206→Double_Elements_Packed 210

SMI_Elements_Packed 206→Tagged_Elements_Packed 214

SMI_Elements_Nonpacked 208→Double_Elements_Nonpacked 212

SMI_Elements_Nonpacked 208→Tagged_Elements_Nonpacked 216

Double_Elements_Packed 210→Tagged_Elements_Packed 214

Double_Elements_Packed 210→Double_Elements_Nonpacked 212

Double_Elements_Nonpacked 212→Tagged_Elements_Nonpacked 216

Tagged_Elements_Packed 214→Tagged_Elements_Nonpacked 216

As elements are added to the array at runtime (e.g., via an instruction 204), the array's ElementsKind is converted (e.g., transitioned) to a less specific ElementsKind if the added representation format is not consistent with the array's current ElementsKind. Because the directed transition graph is acyclic, there are a finite number of transitions possible for an array before it reaches the fixed point ElementsKind of Tagged_Elements_Nonpacked 216.

When an array transitions to an ElementsKind of Double_Elements_Nonpacked 212 or Double_Elements_Packed 210 from SMI_Elements_Nonpacked 208 or SMI_Elements_Packed 206, its elements are converted to their compact unboxed double representation. When an array transitions from Double_Elements_Nonpacked 212 or Double_Elements_Packed 210 to Tagged_Elements_Nonpacked 216 or Tagged_Elements_Packed 214, the array elements are converted (back) into a boxed format, including allocation of heap number objects for all of the double values it contains. An example of programming code (e.g., JavaScript) is as follows:

```
var a = new       // has SMI_Elements_Packed 206
Array( );
a[0] = 1;         // still SMI_Elements_Packed 206
a.push(5);        // still SMI_Elements_Packed 206
a[2] = 2.5;       // transition to Double_Elements_Packed 210, including
                  // conversion to unboxed double format
a[25] = 4;        // transition to Double_Elements_Nonpacked 212 because
                  // array is no longer packed
a[4] = new        // transition to Tagged_Elements_Nonpacked 216.
Object( );        // Unboxed format converted to boxed format again,
                  // including allocating heap numbers for all doubles in the
                  // array.
```

In example aspects, in order to use ElementsKind information to produce faster code, it is possible to use two compilers (e.g., two JIT compilers), including a non-optimizing compiler and an optimizing compiler. For example, the program code (e.g., JavaScript code) is initially compiled into unoptimized architecture-specific assembly code, and performance-critical code is later recompiled by an optimizing compiler. In order to help the optimizing compiler generate optimal code for double arrays, the non-optimized code contains extra checks if an ElementsKind transition is necessary at every store into an array. The non-optimized code also records the ElementsKind of arrays at every load or store to them. In this regard, the non-optimizing compiler runs at runtime (e.g., as a JIT compiler) and is adaptive to the type of feedback gathered while running the non-optimized code. This type of feedback can make the optimization possible.

When a function (e.g., a JavaScript function) with array-accessing code is optimized, the optimizing compiler emits specialized assembly code based on the ElementsKind information collected while running the unoptimized code. For example, this specialized code is gated by a hidden-class value check to ensure that an array has the expected ElementsKind. For arrays with Double_Elements_Nonpacked 212 and Double_Elements_Packed 210 ElementsKind, the optimized code accesses double values directly in their unboxed representation. The optimizing compiler can omit hole checks for arrays that are known to have a Packed ElementsKind (e.g., SMI_Elements_Packed 206, Double_Elements_Packed 210, Tagged_Elements_Packed 214). The optimizing compiler additionally emits array elements transition code only for stores into arrays that required transitions in the unoptimized code. Since transitions can be infrequent, the generated optimized code for arrays with ElementsKind of Double_Elements_Packed 210, which can be a common case, is compact and can approach the efficiency of double array code written in C or C++.

Although infrequent, array elements transitions at runtime can be computationally expensive. As such, it can be advantageous to prevent array transitions in performance-critical code. In a first example, ElementsKind transitions can be hoisted out of loops, relying on the fact that an ElementsKind transition only changes the contents of an array the first time it is executed and has no effect on subsequent executions. An example of programming code (e.g., JavaScript) is as follows:

```
var a = new Array( );        // ← a has SMI_Elements_Packed 206
a[0] = 0; a[1] = 0; a[2] = 0; a[3] = 0; a[4] = 0;   // Still
SMI_Elements_Packed 206
for(i=0;i<5;i++) {
    a[i] = i + .5;           // a transitions to Double_Elements_Packed
                             // 210, but hidden-class check and transition
                             // are hoisted out of loop.
}
```

In a second example, when possible, arrays can be "pre-transitioned" by annotating an array's allocation site with the correct ElementsKind, once information has been collected about the elements that are assigned into the array, preventing further ElementsKind transitions in generated code.

In example aspects, a current instruction (e.g., instruction 202) can be associated with an ElementsKind based on a prior array instruction, particularly for a prior instruction that adds or updates an element for an array. For example, if a prior instruction in program code results in a conversion of a first array (e.g., from an SMI format to a double format), the current instruction for a second array can be associated with a double value, regardless of the actual data type of the value that the current instruction will store (e.g., an SMI). As such, the second array can also be converted (e.g., from an SMI format to a double format), even if the added or updated value is an SMI value.

In a further example, double values are represented in their "native" 64-bit IEEE encoding.

In an alternate system, object pointers are represented as double Not-a-Number (NaN) values in which the pointer address is encoded in the undefined lower 52 bits of the NaN value. All arrays are represented as a vector of 64-bit elements. Although this system may avoid the memory allocation of heap numbers for double values when storing values into an array, it often requires runtime checks of the type of a value to determine whether to process a value as a double or as another type. Furthermore, on a 32-bit instruction architecture, allocating 64-bits elements for arrays that do not contain doubles can be wasteful, consuming twice as much memory as the above-described approaches.

Figure 3:
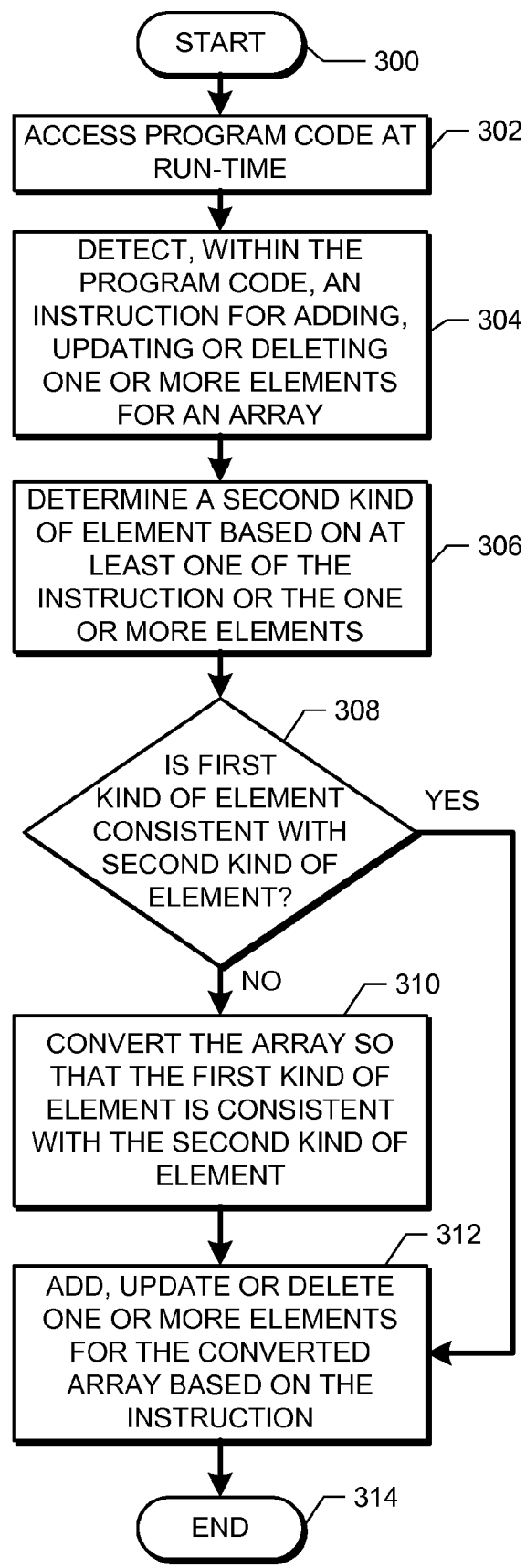
FIG. 3 is a flowchart which illustrates an example of representing an array in dynamically-typed program code at runtime.

FIG. 3 is a flowchart which illustrates an example of representing an array in dynamically-typed program code at runtime. Following start block 300, program code is accessed at runtime at 302. The program code corresponds to a dynamically-typed programming language.

At step 304, an instruction for adding, updating or deleting one or more elements for an array is detected within the program code. The array is associated with a first kind of element (e.g., a first ElementsKind), the first kind of element comprising a first representation format and a first packing format. The array can include a hidden-class value which indicates the first kind of element associated with the array.

At step 306, a second kind of element (e.g., a second ElementsKind) is determined based on at least one of the instruction or the one or more elements, the second kind of element comprising at least one of a second representation format or a second packing format. Each of the first and second representation formats can be one of a small integer type, a double value type or a tagged value type. The tagged value type can correspond to object pointers, small integers or heap numbers. Each of the first and second packing formats can be one of a packed format corresponding to the array having no holes, or a nonpacked format corresponding to the array potentially having at least one hole. In this regard, it is possible that an array with a nonpacked format happens to not contain any holes. For an array with a nonpacked format, however, the accessing code must check for holes (whereas an array with a packed format is guaranteed to be hole-free, and the check is not performed).

The instruction can be for adding or updating one or more elements for the array, and the second representation format can be based on a data type of the one or more elements. In addition, the instruction can be for deleting one or more elements for the array or for adding one or more elements beyond the end of the array, and the second packing format can be the nonpacked format.

At step 308, a determination is made as to whether the first kind of element is consistent with the second kind of element. The determination is based on consistency between the first and second representation formats, and consistency between the first and second packing formats. If the first kind of element is not consistent with the second kind of element, the array is converted so that the first kind of element is consistent with the second kind of element at step 310.

In example aspects, if the instruction is for adding or updating, the converting can comprise converting the array so that the first representation format changes from the small integer type to the double value type, from the small integer type to the tagged value type, or from the double value type to the tagged value type. In other example aspects, if the instruction is for deleting, the converting can include changing the first packing format from the packed format to the nonpacked format, so as to mark the array so that instructions accessing it anticipate holes as a possible element.

In yet other example aspects, a first bit pattern can be stored for values in the array corresponding to holes within the array, and a second bit pattern can be stored for values in the array that are not-a-number (NaN), where the first bit pattern is different than the second bit pattern. For example, there are more than one bit patterns for NaN according to IEEE-754. The first bit pattern is such a NaN (not any other arbitrary bit pattern). Thus, it is possible to avoid the confusion between a hole and an actual NaN by using only a single NaN bit pattern (the second bit pattern) to represent NaN.

In yet other example aspects, the instruction is associated with a third kind of element associated with a third representation format. The third representation format is based on a prior instruction for adding or updating one or more elements for one or more arrays. The determining the second kind of element is based on the third kind of element. An example of programming code (e.g., JavaScript) is as follows:

```
function store_value(x, val) {
    x[0] = val;              // The first call to this function has a double value in
                             // parameter val and converts the array x to
                             // Double_Elements_Packed, furthermore marking the store
                             // instruction to always convert SMI_Elements_Packed
                             // arrays to Double_Elements_Packed, even if val is an
                             // SMI. The third call to this function has an array x with
                             // ElementsKind Object_Elements_Packed and marks
                             // the store instruction to always covert arrays with
                             // ElementsKind SMI_Elements_Packed or
                             // Double_Elements_Packed to
                             // Object_Elements_Packed, regardless of the type of
                             // parameter val or the ElementsKind of x.
}
var x = [0];                 // x is SMI_Elements_Packed
store_value(x, 2.5);         // x is converted to Double_Elements_Packed inside the
                             // function call due to the element value being of type
                             // double.
x = [0];                     // x is SMI_Elements_Packed
store_value(x, 10);          // x is converted to Double_Elements_Packed, even though
                             // the stored element is an SMI.
x = [new Object( )];         // x is Object_Elements_Packed
store_value(x, 10);
x = [0];                     // x is SMI_Elements_Packed
store_value(x, 10);          // x is converted to Object_Elements_Packed
```

It should be noted that transitioning the representation format and the packing format can occur at the same time. The packing format can change to nonpacked not only upon deletion, but also when an element is added beyond the previous end of the array such that there are holes between it and the existing elements. An example of programming code (e.g., JavaScript) is as follows:

```
var a =[1,2,3];       // SMI_Elements_Packed
a[25] =2.5;           // transition to Double_Elements_Nonpacked
```

At step 312, one or more elements are added, updated or deleted for the converted array based on the instruction. The process then ends at end block 314. In example aspects, a determination can be made that the converting is associated with a loop in the program code, and the converting can be hoisted out of the loop, so as not to repeatedly occur in association with the loop. In other example aspects, information related to a kind of element associated with the array can be accessed, the information corresponding to prior runs of the program code, and a number of times that at least one of the determining or the converting is performed can be reduced based on the accessed information.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
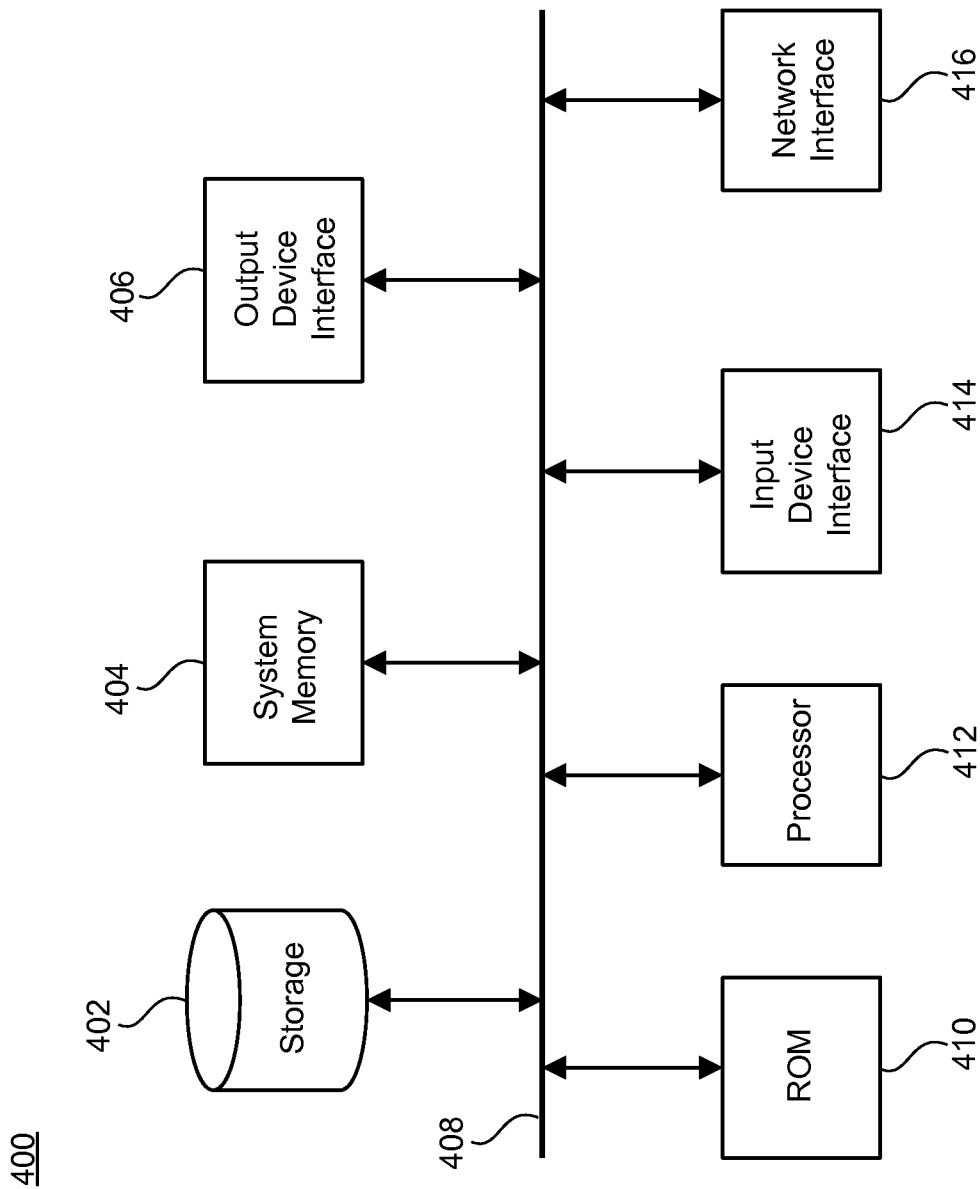
FIG. 4 conceptually illustrates an electronic system with which some implementations of the subject technology are implemented.

FIG. 4 conceptually illustrates an electronic system with which some implementations of the subject technology are implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for processing program code in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method of representing an array in dynamically-typed program code at runtime, the method comprising:
   accessing program code at runtime, the program code corresponding to a dynamically-typed programming language;
   detecting, within the program code, an instruction for adding, updating or deleting one or more elements for an array, wherein the array is associated with a first kind of element, the first kind of element comprising a first representation format and a first packing format;
   determining a second kind of element based on at least one of the instruction or the one or more elements, the second kind of element comprising a second representation format and a second packing format;
   determining that the first kind of element is not consistent with the second kind of element, based on an inconsistency between the first and second representation formats or the first and second packing formats;
   converting the array so that the first kind of element is consistent with the second kind of element; and
   adding, updating or deleting one or more elements for the converted array based on the instruction,
   wherein each of the first and second packing formats corresponds to an indicator value indicating whether the array is either in a packed format in which the array has no deleted or uninitialized elements, or in a nonpacked format in which the array has at least one deleted or uninitialized element, the first packing format being different than the second packing format.

2. The method of claim 1, wherein each of the first and second representation formats is one of a small integer type, a double value type or a tagged value type.

3. The method of claim 2, wherein the tagged value type corresponds to object pointers, small integers or heap numbers.

4. The method of claim 3, wherein the instruction is for adding or updating one or more elements for the array, and wherein the second representation format is based on a data type of the one or more elements.

5. The method of claim 4, wherein the converting comprises converting the array so that the first representation format changes from the small integer type to the double value type, from the small integer type to the tagged value type, or from the double value type to the tagged value type.

6. The method of claim 1, wherein the instruction is for deleting one or more elements for the array or for adding one or more elements beyond the end of the array, and wherein the second packing format is the nonpacked format.

7. The method of claim 6, wherein the converting comprises changing the first packing format from the packed format to the nonpacked format, so as to mark the array so that instructions accessing it anticipate deleted or uninitialized elements as possible elements.

8. The method of claim 1, wherein the array comprises a hidden-class value which indicates the first kind of element associated with the array.

9. The method of claim 1, further comprising:
 determining that the converting is associated with a loop in the program code; and
 providing for hoisting the converting out of the loop, so as not to repeatedly occur in association with the loop.

10. The method of claim 1, further comprising:
 accessing information related to a kind of element associated with the array, the information corresponding to prior runs of the program code;
 reducing a number of times that at least one of the determining or the converting is performed based on the accessed information.

11. A machine-implemented method of representing an array in dynamically-typed program code at runtime, the method comprising:
 accessing program code at runtime, the program code corresponding to a dynamically-typed programming language;
 detecting, within the program code, an instruction for adding, updating or deleting one or more elements for an array, wherein the array is associated with a first kind of element, the first kind of element comprising a first representation format and a first packing format;
 determining a second kind of element based on at least one of the instruction or the one or more elements, the second kind of element comprising at least one of a second representation format or a second packing format;
 determining that the first kind of element is not consistent with the second kind of element, based on an inconsistency between the first and second representation formats or the first and second packing formats, the first packing format being different than the second packing format;
 converting the array so that the first kind of element is consistent with the second kind of element;
 adding, updating or deleting one or more elements for the converted array based on the instruction;
 storing a first bit pattern for values in the array corresponding to holes within the array; and
 storing a second bit pattern for values in the array that are not-a-number (NaN),
 wherein the first bit pattern is different than the second bit pattern.

12. The method of claim 1, wherein the instruction is associated with a third kind of element associated with a third representation format, the third representation format being based on a prior instruction for adding or updating one or more elements for one or more arrays, and wherein the determining the second kind of element is based on the third kind of element.

13. A system for representing an array in dynamically-typed program code at runtime, the system comprising:
 one or more processors; and
 a machine-readable medium comprising instructions stored therein, which when executed by the processors, cause the processors to perform operations comprising:
  accessing program code at runtime, the program code corresponding to a dynamically-typed programming language;
  detecting, within the program code, an instruction for adding or updating one or more elements for an array, wherein the array is associated with a first kind of element, the first kind of element comprising a first representation format and a first packing format;
  determining a second kind of element based on at least one of the instruction or the one or more elements, the second kind of element comprising a second representation format, which is based on a data type of the one or more elements, and a second packing format;
  determining that the first kind of element is not consistent with the second kind of element, based on an inconsistency between the first and second representation formats or the first and second packing formats;
  converting the array so that the first kind of element is consistent with the second kind of element; and
  adding or updating the one or more elements for the converted array based on the instruction,
  wherein each of the first and second packing formats corresponds to an indicator value indicating whether the array is either in a packed format in which the array has no deleted or uninitialized elements, or in a nonpacked format in which the array has at least one deleted or uninitialized element, the first packing format being different than the second packing format.

14. The system of claim 13, wherein each of the first and second representation formats is one of a small integer type, a double value type or a tagged value type.

15. The system of claim 14, wherein the tagged value type corresponds to object pointers, small integers or heap numbers.

16. The system of claim 15, wherein the converting comprises converting the array so that the first representation format changes from the small integer type to the double value type, from the small integer type to the tagged value type, or from the double value type to the tagged value type.

17. The system of claim 13, wherein the instruction is associated with a third kind of element associated with a third representation format, the third representation format being based on a prior instruction for adding or updating one or more elements for one or more arrays, and wherein the determining the second kind of element is based on the third kind of element.

18. A non-transitory machine-readable medium comprising instructions stored therein, which when executed by a system, cause the system to perform operations comprising:
- accessing program code at runtime, the program code corresponding to a dynamically-typed programming language;
- detecting, within the program code, an instruction for deleting one or more elements for an array or for adding one or more elements beyond the end of the array, wherein the array is associated with a first kind of element, the first kind of element comprising a first packing format;
- determining a second kind of element based on at least one of the instruction or the one or more elements, the second kind of element comprising a second packing format;
- determining that the first kind of element is not consistent with the second kind of element, based on an inconsistency between the first and second packing formats;
- converting the array so that the first kind of element is consistent with the second kind of element; and
- deleting the one or more elements for the converted array or adding the one or more elements beyond the end of the converted array based on the instruction,
- wherein each of the first and second packing formats corresponds to an indicator value indicating whether the array is either in a packed format in which the array has no deleted or uninitialized elements, or in a nonpacked format in which the array has at least one deleted or uninitialized element, the first packing format being different than the second packing format.

19. The non-transitory machine-readable medium of claim 18, wherein the second packing format is the nonpacked format.

20. The non-transitory machine-readable medium of claim 19, wherein the converting comprises changing the first packing format from the packed format to the nonpacked format, so as to mark the array so that instructions accessing it anticipate deleted or uninitialized elements as possible elements.

* * * * *